April 9, 1935. J. BYSTRICKY ET AL 1,996,792
LUBRICATING APPARATUS
Filed June 26, 1933
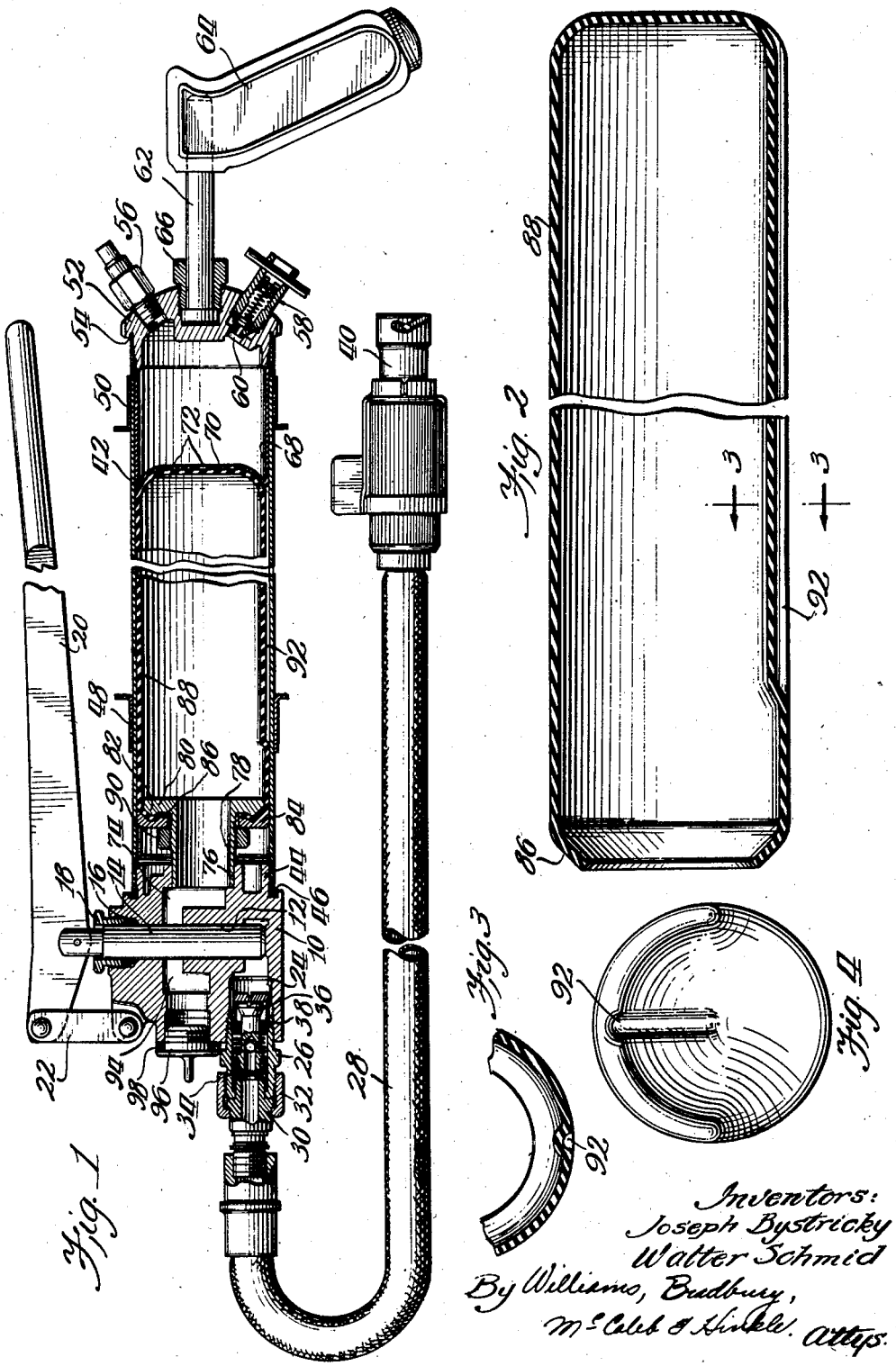
Inventors:
Joseph Bystricky
Walter Schmid
By Williams, Bradbury,
McCaleb & Hinkle, Attys.

Patented Apr. 9, 1935

1,996,792

UNITED STATES PATENT OFFICE 1,996,792

LUBRICATING APPARATUS

Joseph Bystricky and Walter Schmid, Chicago, Ill., assignors, by mesne assignments, to Stewart-Warner Corporation, Chicago, Ill., a corporation of Virginia Application June 26, 1933, Serial No. 677,564

3 Claims. (Cl. 221—47.3)

Our invention relates generally to lubricating apparatus, and more particularly to an improved reservoir construction for portable lubricant compressors, usually termed grease guns.

In hand operated lubricant compressors in which the lubricant is fed to the high pressure cylinder under the pressure of compressed air, difficulty is occasionally experienced due to the leakage of air past the follower or separator piston conventionally interposed between the lubricant containing portion of the barrel and the portion which contains the air under pressure. Provision must also be made in this type of construction to prevent canting or tilting of the follower piston in the barrel. Furthermore, it is usually desirable to provide some means for withdrawing the follower piston. The parts necessary to fulfill these requirements are likely to get out of order and increase the cost of manufacture of the compressor.

We have therefore devised an improved form of lubricant compressor in which the necessity for a follower piston is eliminated, and instead have provided a collapsible flexible sack for containing the lubricant in the compressor and preventing admixture of air therewith.

A further object of our invention is to provide a sack of improved construction to separate the lubricant from the air in a compressed air primed lubricant compressor.

A further object is to provide an improved sack which will collapse to eject substantially all of the lubricant contained therein.

Other objects will appear from the following description, reference being had to the accompanying drawing, in which:

Figure 1 is a central vertical section of our improved lubricant compressor;

Figure 2 is a central longitudinal sectional view of the collapsible lubricant containing sack;

Figure 3 is a fragmentary sectional view thereof, taken on the line 3—3 of Fig. 2; and Figure 4 is an end view of the sack showing it in collapsed position.

The lubricant compressor of our invention comprises a head 10 having a bore 12 forming a high pressure cylinder for a reciprocable plunger 14, the escape of lubricant past the plunger being prevented by a packing 16 held in place by a packing nut 18. The plunger is reciprocated in the usual manner by a lever 20 pivotally connected to the end of the plunger and to the ends of a pair of links 22, the other ends of which are pivotally connected to the head 10. The bore 12 terminates in an outlet passageway 24, the end portion of which is threaded to receive a coupling member 26. A lubricant discharge conduit 28 has a fitting 30 at its end, which is adapted to project into the coupling member 26 and be held in place therein by an apertured cap nut 32.

A spring pressed cup leather 34 seals the connection between the coupling member 26 and the fitting 30, this cup leather being carried by the stem of a valve 36 cooperable with a seat 38. The construction is such that when the fitting 30 is connected to the coupling member 26 the valve 36 will be opened. The other end of the discharge conduit 28 has a coupler 40 secured thereto for detachable connection with lubricant receiving fittings, the couplers shown being particularly adapted for connection to fittings of the so-called "pin fitting" type.

A barrel 42 is threaded to an annular flange 44 formed integrally with the head 10, a gasket 46 being lodged in an annular recess formed in the head and being adapted to be engaged by the end of the barrel 42 to form an air-tight seal. The barrel 42 is provided with flanged rings 48, 50, which define the handle portion of the barrel and prevent the hand from slipping.

The end of the barrel 42 is closed by a cap 52 which is threaded into the barrel and has a gasket 54 for making an air-tight seal therewith. The cap has an air admission valve 56 secured therein, this valve being preferably of the type used on pneumatic tires. The cap also has a relief valve 58 threaded therein and normally closing a vent opening 60 formed in the cap. The stem 62 of a handle 64 is secured to the head 52 by a threaded sleeve 66. Within the barrel 42 adjacent the cap 54 is a cup-shaped stamping 68, the bottom 70 of which is provided with a plurality of perforations 72.

Lubricant is supplied to the high pressure cylinder 12 through a passageway 74 formed in the head 10, the passageway 74 terminating in an opening 76 into which a bushing 78 is pressed. The bushing may be soldered or welded in place so as to prevent leakage of air from the interior of the barrel 42 to the passageway 74. The bushing 78 has a flange 80 formed integrally therewith, the flange having an annular ridge 82 formed thereon.

A washer 84 has its surface facing the flange 80 formed complementally thereto, and is adapted to clamp the end flange 86 of a rubber sack 88 thereagainst. The washer 84 is clamped against the flange 86 of the rubber sack by a nut 90 threaded on the bushing 78. The sack 88 is preferably made of a durable, flexible, slightly elastic and lubricant-resistant rubber. The sack is generally cylindrical in shape, except for a longitudinal groove 92 extending along the side wall of the sack substantially the full length thereof. Lubricant is adapted to be supplied to the sack 88 through an extension 94 of the passageway 74, the end of the passageway being normally closed by a plug 96 and sealed by a packing 98.

When it is desired to fill the lubricant compressor, the plug 96 is removed and a suitable nipple carried on the end of a conduit threaded in its place, and lubricant under pressure forced through the conduit and into the passageway extension 94, and the plunger 14 being removed so that the passageway 74 is in communication with its extension 94, lubricant will flow through the bushing 78 into the sack, expanding the latter substantially to the shape in which it is shown in Figs. 1 and 2. Previous to this operation the vent valve 58 may be held open so that the sack may expand against atmospheric pressure only. When the sack has been completely filled it will be arrested by the bottom 70 of the cup shaped stamping 68. The lubricant supply conduit may then be disconnected from the end of the passageway extension 94, and the plug 96 replaced. Thereafter, the vent valve 58 having been closed, air under pressure may be forced into the handle end of the compressor barrel 42 through the valve 56. The compressor is then ready for use and the coupler 40 may be connected to fittings attached to bearings to be lubricated, and the lever 20 and plunger 14 reciprocated to force lubricant under pressure to the bearings.

When the end of the plunger 14 uncovers the passageway 74 the compressed air within the barrel 42 will cause partial collapsing of the sack 88, and consequent discharge of lubricant under pressure into the high pressure cylinder 12. The collapsing of the sack 88 will take place in a regular manner, due to the provision of the groove 92 in the wall thereof. The air pressure acting upon the surface of the sack around the groove 92 will force that portion of the sack inwardly until, as the lubricant is forced from the sack, the latter will assume the shape illustrated in Fig. 4. The outermost end of the sack will collapse first and there will be no tendency of the innermost end of the sack to collapse first and thus form a constriction which might prevent the discharge of all of the lubricant from the sack.

If desired, venting of the barrel by opening the valve 58 may be omitted prior to the filling operation if the source of lubricant is under sufficient pressure to feed lubricant against the air pressure within the barrel. If the sack 88 should become damaged or wear out, the nut 90 may be loosened and the flange 86 of the sack removed from between the flange 80 and the washer 84 and replaced with a new sack. If, instead of soldering or welding the bushing 78 in the bore 76 of the head 10, it is screw threaded therein, the sack 88 may be removed from the barrel of the compressor after the lubricant has been ejected therefrom, and a filled sack of lubricant substituted therefor, the sack thus serving as a removable grease cartridge for the grease gun.

While we have shown and described a particular embodiment of our invention it will be readily understood by those skilled in the art that variations may be made in the construction disclosed without departing from the basic features of our invention. We therefore do not wish to be limited to the precise construction disclosed but wish to include within the scope of our invention all such modifications and variations which will readily suggest themselves.

What we claim as new and desire to secure by United States Letters Patent, is:

1. A lubricant compressor comprising a head having high pressure pumping means associated therewith, an air tight barrel secured to said head, means for supplying air under pressure to said barrel, a collapsible lubricant sack within said barrel for supplying lubricant to said pumping means, and apertured means positioned in said barrel at a point intermediate its ends for preventing excessive expansion of said sack.

2. A lubricant compressor comprising a head having high pressure pumping means associated therewith, an air tight barrel secured to said head, means for supplying air under pressure to said barrel, a member for conducting lubricant to said pumping means, and a flexible collapsible lubricant-tight sack removably secured to said member and positioned within said barrel and having its external surface subjected to the air pressure therein and communicating with said high pressure pumping mechanism through said member, said sack being capable of being removed when empty, refilled, and replaced in said barrel.

3. A lubricant compressor comprising a head having high pressure pumping means associated therewith, an air tight barrel associated with said head and forming a handle therefor, a flexible sack detachably secured within said barrel and forming a lubricant supply reservoir for said pumping means, means for replenishing the supply of lubricant in said sack while the latter is within said barrel, a perforated wall extending across said barrel intermediate the ends of the latter, and check valve means for supplying air under pressure to said barrel.

JOSEPH BYSTRICKY.
WALTER SCHMID.